Figure 1:
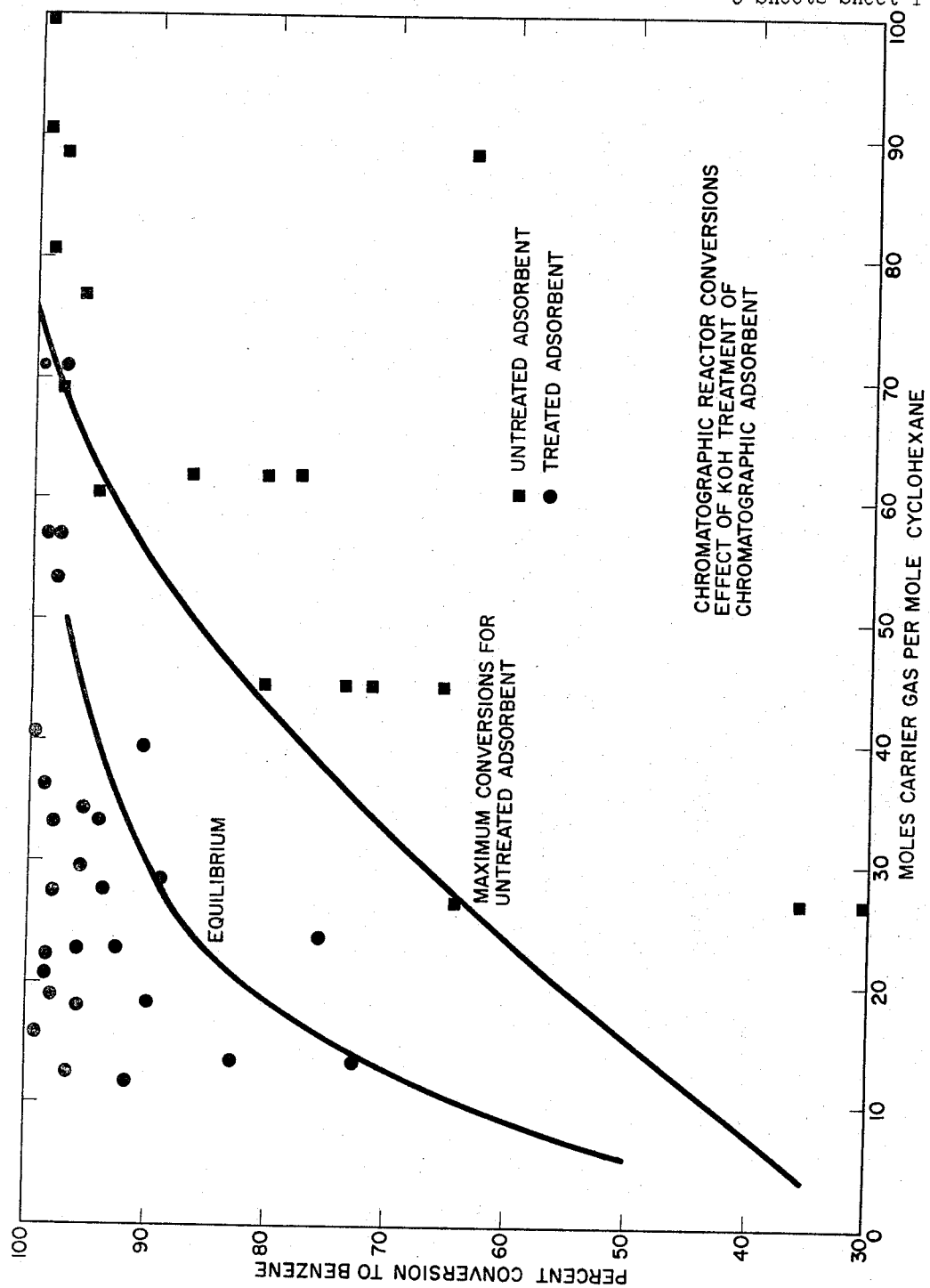

John M. Matsen
John W. Harding  INVENTORS
BY Frank A. Simock
PATENT ATTORNEY

John M. Matsen
John W. Harding

INVENTORS

BY  Frank A. Simrock

PATENT ATTORNEY

John M. Matsen
John W. Harding   INVENTORS

BY *Frank A. [signature]*

PATENT ATTORNEY 3,326,994
CHROMATOGRAPHIC CONVERSION OF CYCLO-
HEXANE TO BENZENE
John M. Matsen, Roselle, and John W. Harding, Westfield, N.J., assignors to Esso Research and Engineering Company, a corporation of Delaware
Filed Dec. 3, 1963, Ser. No. 327,683
11 Claims. (Cl. 260—668)

The present invention relates to improved catalytic conversion processes in which high conversions are obtained despite unfavorable chemical equilibrium for the reactions. More particularly this invention relates to an improved process in which a fluent carrier (which may be either an inert diluent or one of the feedstocks) is continually unidirectionally flowed through at least a segment of an elongate bed of catalyst having a substantially linear adsorption isotherm (passing through the origin for both adsorption and desorption) and wherein pulses of a fluent feedstock are periodically introduced into said carrier under conditions to obtain at least two reaction products which are continuously separated from each other by differences in adsorptivity on the adsorbent. Yet more particularly, in a preferred embodiment, this invention relates to treating said catalyst or in the case of a supported catalyst, preferably the support prior to impregnation, with a mixture of methanol and a base to neutralize the very strongly acidic sites on the catalyst. Most particularly in a preferred embodiment this invention relates to utilizing a catalyst plus adsorbent system having a substantially linear adsorption isotherm under optimum pulse size and frequency conditions.

It is known that chemical reactions of the sort

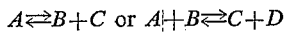

may be directed to the right by injecting pulses of A into a chromatographic column which catalyzes the reaction. Under such conditions the products B and C or C and D will be separated from each other causing the reaction to proceed to high conversions despite an unfavorable equilibrium constant.

The present process is advantageously used with reactions having the following well-defined set of conditions:

(1) The equilibrium constant for the reaction must be small.

(2) Reaction rates should be high enough so that separation of products rather than rate of reaction limits the extent of reaction.

(3) At least two products should be formed which are chromatographically separated in the reactor.

(4) Reactants should not be separated in the reactor. For best results this limits one to a single reactant, or to two reactants where one also serves as the carrier gas.

It has now been discovered that with most catalysts (including those reported by prior reseachers in this field) only small improvements in conversion are obtained in the pulse reactor system over what would result from allowing the same quantities of reactants and carries gas to reach a static equilibrium. By comparison, specifically by treating such catalysts so as to obtain an adsorptivity approximating a linear adsorption isotherm, e.g. treating alumina with a sodium hydroxide-methanol solution, about 30% greater conversion is obtained in the pulse system as compared to a static system. Alternatively, this improvement may be utilized to reduce the carrier gas requirements so that only ⅕ as much carrier gas is required to reach the same conversion.

The present invention may be carried out by selecting an ordinary gas chromatography adsorbent having a linear adsorption isotherm (as previously defined) and mixing or impregnating it with suitable catalytic materials to obtain without further treatment the desired catalyst for use in the process. Alternatively, an acidic type adsorbent may be treated in such a way as to neutralize the very strongly acidic adsorption sites which cause the isotherm to be highly nonlinear and hence cause undesirable tailing which in turn causes low conversions. Preferably the support is treated prior to impregnation with the catalytic material. The support preferably is treated with a basic material. In a preferred embodiment, the basic system is a strong base such as sodium hydroxide or potassium hydroxide in a solvent e.g. alcohol or water. The preferred strength is .1 to 40 wt. percent, preferably 1 to 20 wt. percent, base in alcohol, e.g. KOH and alcohol. The amount used and the time of reaction are selected to obtain uniform reaction sites without overly reducing the total adsorptivity. It should be noted that if the alternative procedure of treating the catalyst after impregnation is used that materials should preferably be used which will not dissolve and remove the catalytic element.

Numerous other steps in catalyst preparation are known to affect the constancy of heat of adsorption and hence the linearity of the adsorption isotherm. Among the factors that are known to induce greater uniformity in heats of adsorption of ammonia on eta alumina are the following: deposition of platinum, .3 wt. percent; deposition of platinum followed by treatment with chlorine gas; presence of water on the surface; calcining at high temperatures (1100–1600° F.); and doping with 5 mol. percent KOH followed by high temperature calcining.

Preferred catalyst supports are: alumina, silica, silica-alumina, molecular sieves, activated carbon, kieselguhr. In general an activation step will be desirable after treatment. This may include heating in a flowing gas stream to desorb undesired materials taken up in activation or previously and may also include treatment with hydrogen to remove surface oxides, etc.

The present invention will be more clearly understood from a consideration of a specific reaction system, i.e. the dehydrogenation of cyclohexane to benzene and hydrogen in the presence of a commercially available 0.6 wt. percent platinum on alumina catalyst:

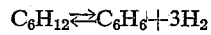

using helium as the carrier gas. Referring to the drawings in FIGURE 1 it can be seen that by use of the present invention the treated adsorbent runs provided generally twice the conversion with a given amount of carrier gas or else for that conversion only 20% as much carrier gas is required. It is noted that scatter in the data is largely due to the fact that there are other operating variables besides moles carrier gas per mole cyclohexane as will be described. It is noted that the higher points on the graph represent the optimized variables.

Figure 2:
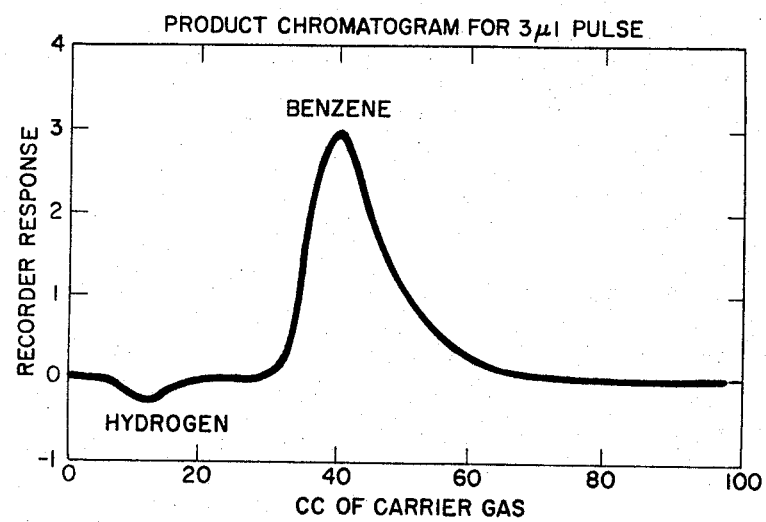
Figure 3:
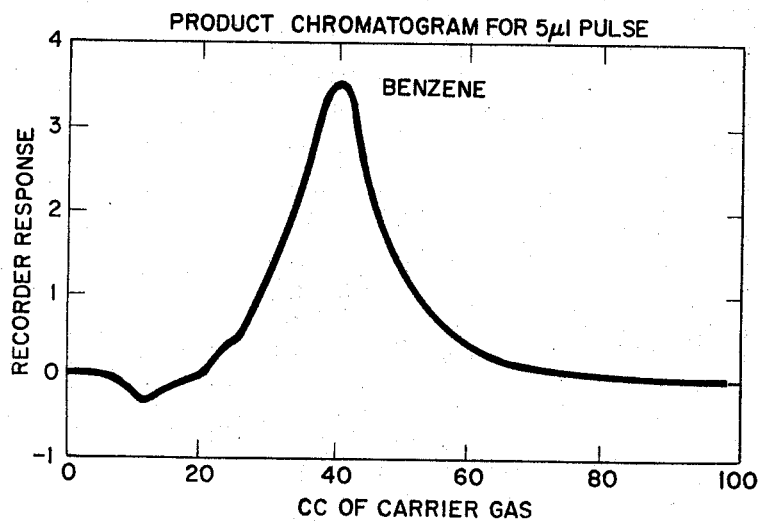
Figure 4:
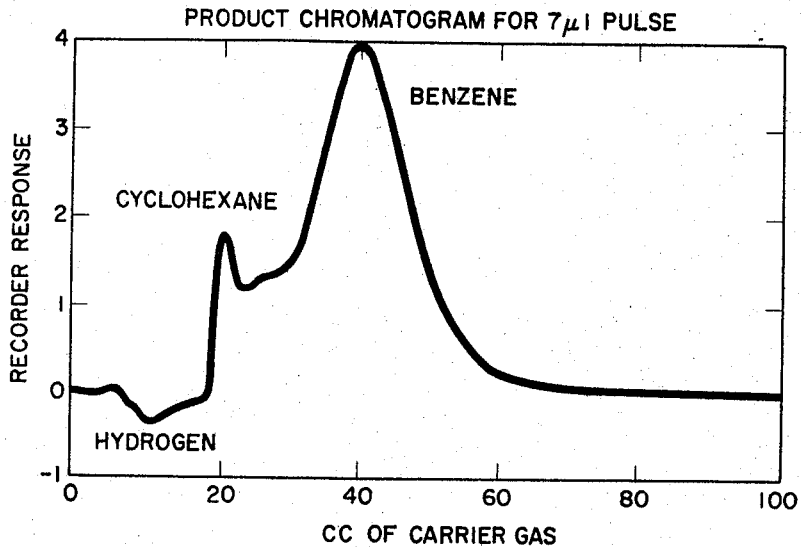

Optimum conditions are obtained in any reaction system first by adjusting the pulse size to obtain as high a throughput as possible. Referring to the accompanying drawings of the system cyclohexane to benzene and hydrogen (which can be generalized by considering hydrogen as the fast moving product, benzene the slow moving product and cyclohexane the intermediate velocity reactant(s)). With a small sample the product chromatograph (FIG. 2) indicates that the e.g. hydrogen and benzene peaks are well separated and fairly sharp. As sample size is increased these peaks tail off toward each other (FIG. 3). Such tailing is inherent in this mode of operation and is due to the fact that the products are produced in decreasing amounts as cyclohexane is consumed along the column. When large samples (FIG. 4) are introduced a sharp peak of unreacted cyclohexane appears between hydrogen and benzene. This peak increases in height very rapidly as pulse size is increased. The optimum size pulse is therefore adjusted downward to the point where this peak is barely discernible.

Figure 5:
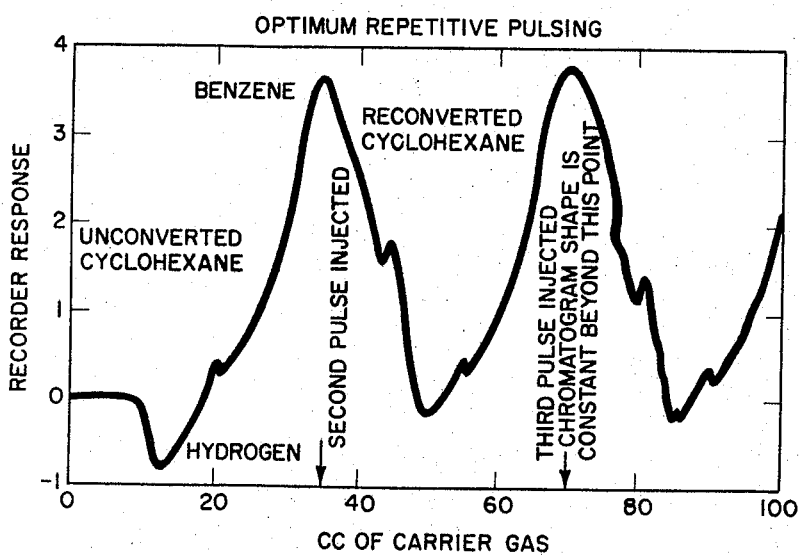

After adjusting the pulse size, pulse frequency is adjusted. At very low frequencies conversions are the same as for single pulses. For a given pulse size this represents the maximum conversion. To maximize throughput as high a pulse rate as possible is desired. This is obtained by increasing the pulse rate until pulsing is so rapid that the hydrogen peak from a fresh pulse comes soon enough to pass through part of the benzene peak from the previous pulse. When this happens the hydrogen and benzene recombine and a new cyclohexane peak appears in the chromatogram on the declining phase of the cycle (FIG. 5). Therefore, frequency is adjusted to the point where this peak is just discernible. It has been found that conversion decreases considerably as frequency increases following the appearance of this peak. Alternatively, of course, but less preferably, optimum operations may be obtained by adjusting pulse frequency first before adjusting pulse size.

With respect to the amount of carrier gas this is adjusted depending upon the desired throughput. The final decision is, of course, a function of the percent conversion desired vs. separation of carrier gas, etc. costs.

The carrier to be employed in accordance with the present invention may comprise a liquid or gaseous medium. The carrier may be inert with respect to the catalytic conversion to be effected. The carrier may also be reactive with the fluent feedstock (e.g., ammonia may be used as carrier in conducting ammonolysis reactions; water or steam may be used in conducting hydrolysis reactions; oxygen may be used in oxidation reactions

etc.). The feed material and reaction products should be capable of forming a single phase with the carrier. Thus they should volatilize into a gaseous carrier or should be soluble in a liquid carrier.

Thus, for vapor phase reactions substantially chemically inert non-polar gases such as nitrogen, helium, etc. may be employed widely whereas gaseous mediums containing or consisting substantially of materials such as steam, flue gas, carbon dioxide, carbon monoxide, and even oxygen, hydrogen, hydrogen sulfide, gaseous hydrocarbons, etc. may be employed. When a liquid phase reaction is to be conducted, liquid or liquefied carriers such as benzene, liquefied butane, water, alcohols, ethers, etc. may be employed.

In accordance with the present invention, a solid conversion catalyst is utilized, such catalyst being employed in a finely divided condition and preferably being supported on a high surface area, preferably microporous carrier such as activated gamma alumina, etc. Although the state of subdivision of the catalyst particles and the porosity thereof may be varied within wide limits, depending on the nature of the catalytic conversion to be effected, it is generally preferable to employ a particular catalyst having a particle size within the range of 3 to 60 mesh (.25″ to .01″). It is also preferred to use catalysts having surface areas in the range of 25–1000 m.$^2$/gm., preferably 50–500 m.$^2$/gm., preferably in the upper part of these ranges.

The process of the present invention may be employed advantageously with respect to fluent phase catalytic processes for the conversion of fluent reactants in the presence of solid conversion catalysts wherein the reaction mixture that is formed contains at least one component having a rate of travel through a bed of finely divided catalyst different from the rate of travel of other components. Thus, the dehydrogenation of olefinic, aliphatic, and naphthenic hydrocarbons may be effected with improved results in the presence of a finely divided dehydrogenation catalyst such as chromia, molybdena, or platinum supported on a high surface area carrier such as alumina, or as essentially $Fe_2O_3$ catalyst comprising 70 to 80 percent $Fe_2O_3$, 3 percent $Cr_2O_3$, and 17 to 29 percent $K_2CO_3$. Similarly, combined isomerization-dehydrogenation reactions may be conducted in the presence of finely divided solid isomerization-dehydrogenation catalysts such as platinum or palladium on gamma alumina. As another example, combined dehydrogenation-condensation reactions (i.e., dehydrogenation-alkylation reactions) may be effected. Still further examples of processes which may be advantageously conducted in accordance with the present invention include processes for the catalytic preparation of deuterium from HD, etc. Representative specific examples are the dehydrogenation of propane to propylene, the dehydrogenation of butane to butene, the dehydrogenation of butenes to butadiene, the dehydrogenation of cyclohexane to form benzene, the combined isomerization and dehydrogenation of normal pentane to isopentene to isoprene, the combined isomerization-dehydrogenation of methylcyclopentenes and methylcyclopentanes to cyclohexanes and aromatic hydrocarbons, the combined dehydrogenation-condensation of propane or propane-butane mixtures to form $C_6$ to $C_8$ hydrocarbons predominantly, etc. Conventional conversion processes of the type mentioned above are described in greater detail in references known to those skilled in the art, such as "The Chemistry of Petroleum Hydrocarbons," vol. 2, published by Reinhold Publishing Corp., 1955, wherein conventional conversion and conditions and catalysts for processes of the type contemplated by the present invention are described in greater detail. Therefore, in the interest of clarity of disclosure, this specification will not be burdened with known details of this nature, since the specific conversion conditions and specific catalyst compositions to be employed for any given catalytic conversion process are known to those skilled in the art, and since the present invention is concerned with an improved method for conducting such processes. Other conversion conditions may be used, since operation with unfavorable equilibrium constant is possible.

The present invention may also be used with plural reactants. Among the catalytic conversion operations employing plural components which may be conducted in accordance with the present invention are reactions such as the catalytic conversion of carbon dioxide to carbon monoxide in the presence of hydrogen, and the catalytic conversion of hydrogen chloride to chlorine in the presence of oxygen. (This type of reaction is equilibrium limited.)

The catalyst to be employed in a particular situation will, of course, be a catalyst which will suitably promote the desired reaction. The catalyst should be in a finely divided condition and may have, for example, a particle size within the range of 3 to 60 mesh.

Numerous examples of suitable conversion processes which may be conducted in accordance with the present invention will suggest themselves to those skilled in the art. By way of example, suitable conversion processes may be found in the text, "Principles of Organic Chemistry," by Enslish and Cassidy.

The intermittently introduced reactant and the reaction products should form a single homogeneous phase with the continuously flowing reactant. Thus, they must be gases or volatile liquids for a gaseous continuous reactant. They must be soluble in a liquid continuous reactant.

The particulate catalyst is arranged within an elongate conversion zone and the slow reactant is continuously flowed therethrough whereas the fast reactant is periodically introduced, or vice versa. The desired conversion conditions of temperature and pressure are maintained within the conversion zone with appropriate auxiliary equipment such as pumps, preheaters, heat exchangers, etc. The rate of flow of the reactants (feed material) through the conversion zone and the length of the conversion zone should be sufficient to provide for a feed material contact time sufficient to permit at least partial fractionation of at least one component of the reaction mixture during passage through the conversion zone.

It is noted that in addition to obtaining high conversions the present invention also provides a means of concentrating (separating) desired products. Thus, the product pulses may be synchronized with reactor effluent valving controls to separate a concentrated product from other products, etc.

The present invention will be more clearly understood from a consideration of the following examples.

*Example 1*

A reactor 50 cm. in length consisting of ¼″ O.D. stainless steel tubing was packed with 8 grams of a commercially available 0.6 wt. percent platinum on eta alumina support catalyst which had been ground to 40 to 60 mesh. This commercially available catalyst was treated prior to use by percolating 1 gram of KOH in 10 grams of methanol through the column for a period of 10 minutes followed by drying at 100° C. with hydrogen, and activating to remove adsorbed water and methanol by heating at 375° C. while passing hydrogen through the column. The reactor was installed in place of the usual analytical column in a commercial model gas chromatograph which was used without other modification. After activation of the catalyst, helium was used as the carrier gas and cyclohexane was injected through a rubber septum at the reactor inlet. The thermal conductivity of the effluent gas was recorded potentiometrically. The trace obtained is hereafter referred to as the product chromatogram although it is not a chromatogram in the conventional sense of the word. Additionally, total product samples were trapped from the effluent stream at −78° C. and were analyzed in a two meter Perkin Elmer "R" column. Results were obtained at temperatures of 183° C., 204° C. and 225° C., in each case the runs were carried out utilizing pressures of 1 to 1.5 atmospheres (a pressure gradient exists) and 10 cc. per minute carrier gas flow.

During the first few pulses of cyclohexane supplied to the fresh catalyst in the reactor the product chromatogram changed considerably. This corresponded to coking of part of the catalyst surface. After perhaps 5 to 10 pulses the reactor reached a steady state and there was little further change in pulse chromatograms. Material balances show that 96% to 98% of the reactant left the reactor once "steady state" has been reached. In all cases only benzene and hydrogen appeared as products and no cyclohexene or cyclohexadiene were detected.

Referring to the accompanying drawings FIGURE 5 described the pulse chromatograph obtained at 225° C. and 10 cc./min. carrier gas flow rate under optimum conditions of size and frequency of pulse. It can be seen that optimum conditions have been achieved and only small peaks for unconverted cyclohexane and reconverted cyclohexane are obtained. These optimum conditions are found by first supplying pulses of varying sizes to obtain minimization of the peak for unconverted cyclohexane shown on the rising curve. After the optimum size of pulse has been determined the frequency is then adjusted to similarly minimize the peak on the declining curve representing reconverted cyclohexane. It is noted that choosing of these optimum conditions is quite important in that for example, referring to the figure a variation in pulse size of say+20% from optimum at constant frequency reduced conversion on the order of 6%, while a variation in frequency of +15% from optimum reduced conversion on the order of 17%.

For comparison, runs were carried out with the same commercial catalyst which had not been pretreated with potassium hydroxide and methanol and with the pretreated catalyst at temperatures of 225° C. and using carrier gas rates of 10 cc./min. and 20 cc./min. The results of this comparison are shown in FIGURE 1. FIGURE 1 represents the previously referred to product samples which were trapped and analyzed i.e. each sample included the product of 2 to 5 pulses. It can be seen that with a treated catalyst the conversion is increased approximately 30% or for a similar conversion only 20% as much carrier gas is required. It is noted that scatter in the data is largely due to the other operating variables besides moles carrier gas per mole cyclohexane previously described. The higher points on the graph represent the variables optimized as previously described. In any case it is readily apparent that virtually all of the runs on a treated catalyst are better than corresponding ones on an untreated catalyst, and that all of the treated catalyst results are above the calculated curve for equilibrium results (see FIGURE 1) i.e. obtained merely by the dilution effect in a nonpulse flow reactor.

*Example 2*

In this example adsorption data are reported of benzene on the samples of untreated and potassium hydroxide treated ($Pt/Al_2O_3$) catalyst which were used for the pulse reactor results reported in Example 1. The differences found are consistent with the observed results in the pulse reactor.

Benzene was added in doses at about five minute intervals to th catalyst samples at 200° C. in a glass system. One half hour after the last addition, the benzene was removed dosewise at five minute intervals. After an overnight evacuation at 200° C. the experiments were repeated. From pressure and volume measurements the sorption of benzene was calculated.

It should be noted that these are not conventional adsorption equilibrium measurements since complete equilibrium would probably take several hours per point. The short time interval between doses was selected to give time for temperature equilbrium and to more closely approach the treatment a sample would see in a pulse reactor.

Figure 6:
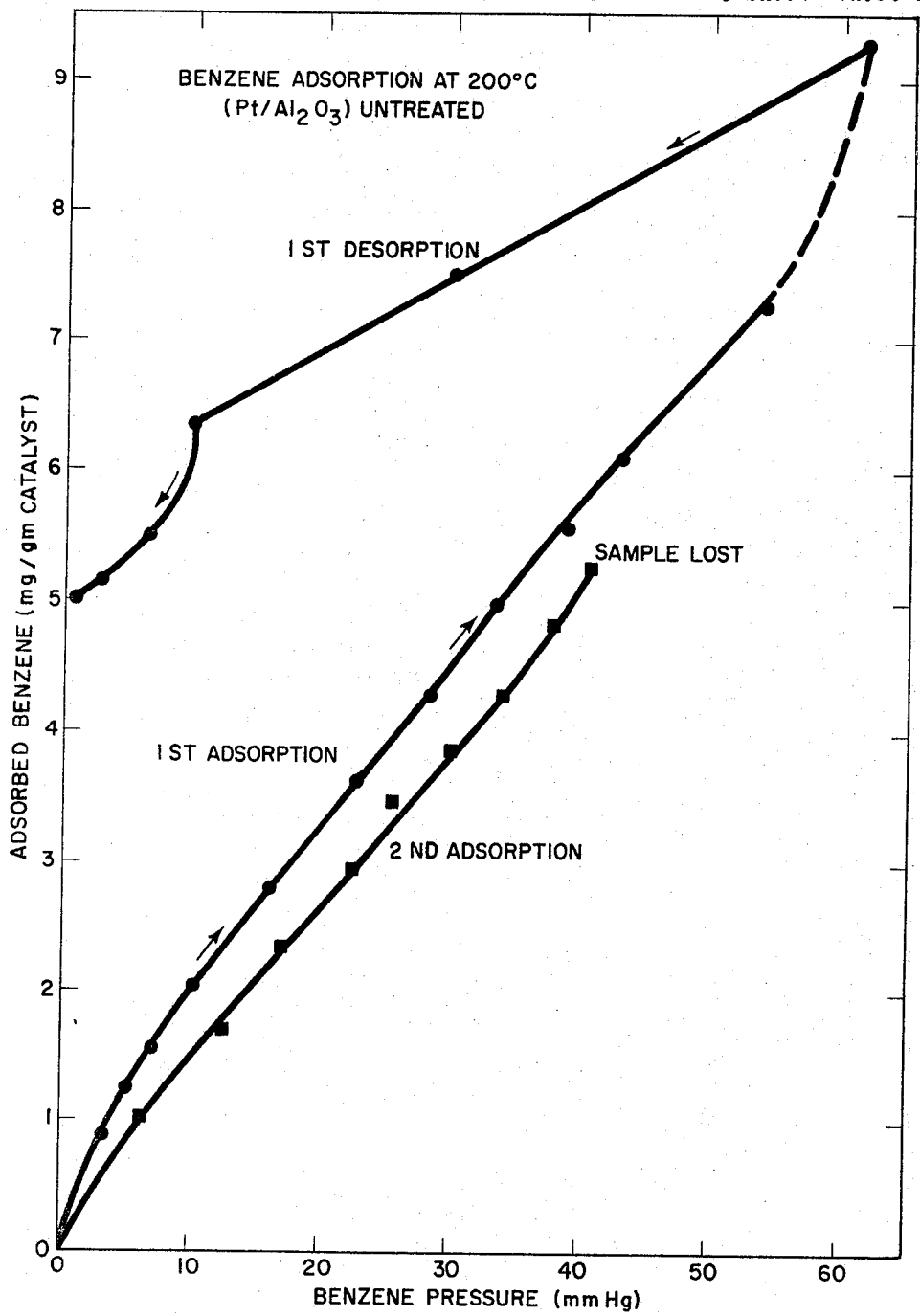
Figure 7:
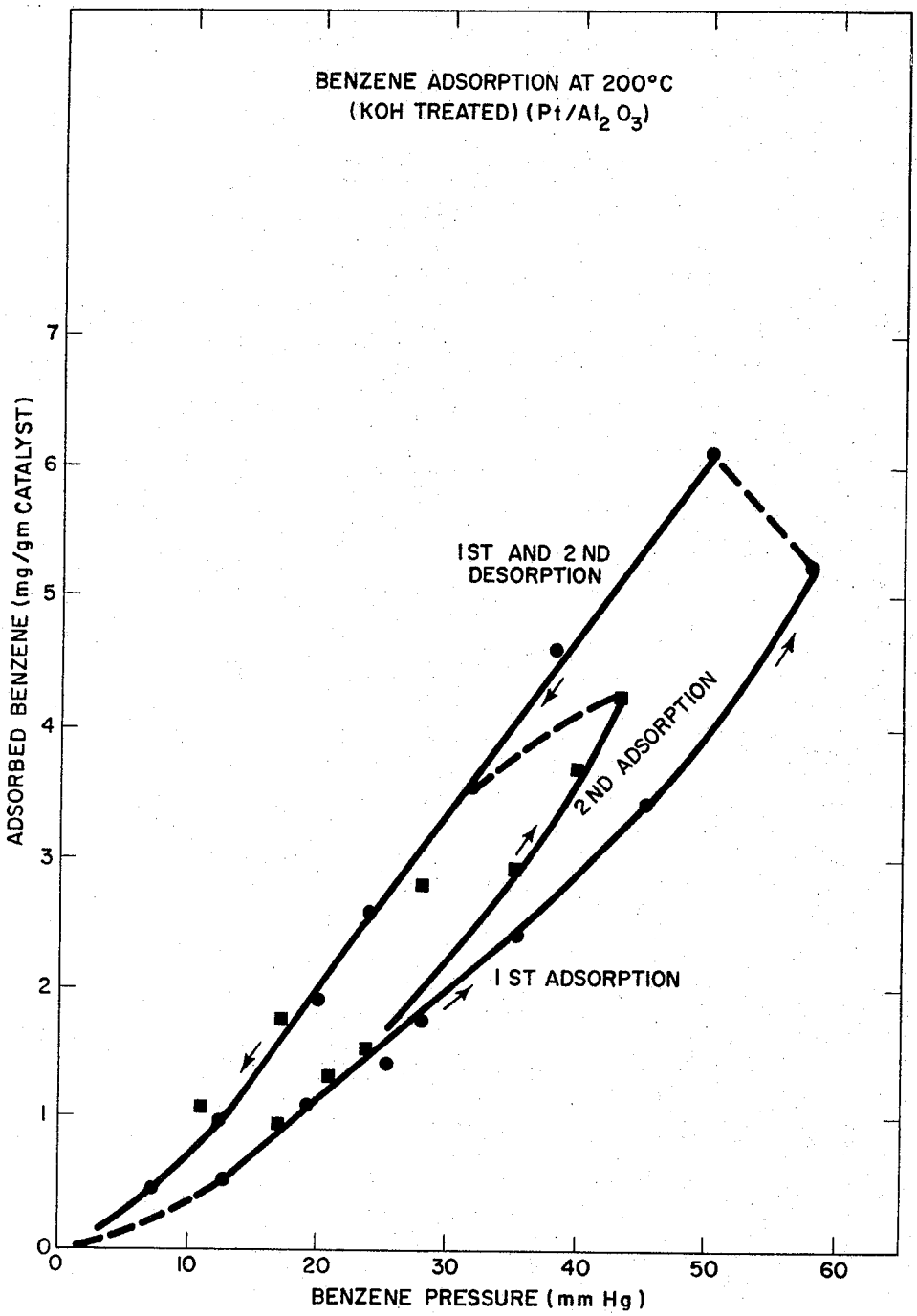

The results for the two samples are shown in FIGURES 6 and 7 as amount of benzene sorbed/gm. catalyst plotted against benzene pressure. The major differences between the two samples which affect pulse reactor results are seen on the desorption portions of the curves.

(1) The untreated sample shows appreciable non-linearity as the pressure goes below about 10 mm. Hg, while the KOH treated sample gives a linear result. This difference would lead to the longer benzene pulse tail observed in the untreated catalyst.

(2) With the relatively short times involved, the treated sample retains almost no benzene while the untreated sample retains over one-half the adsorbed amount at 1 mm. Hg. Judging from the second adsorption curve on the untreated sample most of this retained benzene is removed by overnight evacuation. This retained benzene affects the pulse shape only slightly, but contributes to lower conversions in a pulse reactor by being partially reconverted to cyclohexane as the hydrogen peak passes.

The disagreement between the adsorption curves on the treated sample is attributed to a slightly longer time interval for the last few points. The agreement between the desorption curves on the same sample show that the discrepancy is not significant.

From FIGURES 6 and 7 and the above discussion it can be seen that the adsorption-desorption isotherms preferably must go through or near the origin to obtain complete removal of the adsorbed material between pulses (i.e. to make efficient use of the adsorbent) and that the curve must be linear for the reasons above described, e.g. to prevent tailing, etc.

It is to be understood that this invention is not limited to the specific examples which have been offered merely as illustrations and that modifications may be made without departing from the spirit of the invention.

What is claimed is:

1. In a process for the fluent phase catalytic chemical conversion of a fluent feed material to at least two products in a chromatographic conversion zone in the presence of a finely divided catalytically active solid wherein a fluent carrier is continually flowed through said conversion zone under conversion conditions, pulses of said feed material are periodically introduced into said conversion zone under conditions to obtain continuous separation of at least a portion of at least one of the products formed by conversion of said material in said conversion zone from the other product or products, and thereafter conversion products are recovered fom said carrier, the improvement which comprises utilizing as the finely divided catalytically active solid, a material having a substantially linear adsorption-desorption isotherm.

2. The process of claim 1 in which the finely divided catalytically active solid has a substantially linear adsorption-desorption isotherm passing through the origin.

3. The process of claim 2 wherein the carrier and reactants are liquid.

4. The process of claim 2 wherein the carrier and reactants are vaporous.

5. The process of claim 2 wherein the carrier is an inert carrier.

6. The process of claim 2 wherein the carrier is reactive with a feed material component.

7. The process of claim 2 in which the finely divided catalytically active solid having a substantially linear adsorption-desorption isotherm passing through the origin is obtained by treating a conventional catalyst with a basic material to neutralize the very strongly acidic adsorption sites on the catalyst.

8. The process of claim 7 in which the catalyst is a supported catalyst and the catalyst support is treated with the basic material prior to impregnation.

9. The process of claim 7 in which the catalyst is treated with 0.1 to 40 wt. percent NaOH in methanol.

10. The process of claim 2 in which optimum pulse size and frequency to obtain maximum throughput and conversion is achieved by first adjusting pulse size downwardly until the peak for unreacted feed on the ascending phase of the effluent chromatogram is barely discernible and then increasing pulse frequency until a peak for feed reformed due to the fast moving product catching up with the slow moving product from an earlier pulse appears on the declining phase of the effluent chromatogram.

11. A process for the catalytic conversion of cyclohexane to benzene and hydrogen which comprises continually flowing an inert gas through a chromatographic conversion zone containing a 0.6 wt. percent platinum on eta alumina catalyst which had been treated with a 10 wt. percent NaOH in methanol solution to neutralize strongly acidic adsorption sites on the catalyst, periodically introducing pulses of cyclohexane in said conversion zone under conditions to obtain continuous separation of at least a portion of the benzene formed by conversion of cyclohexane in said conversion zone and thereafter recovering conversion products from the said inert carrier gas.

References Cited
UNITED STATES PATENTS

| | | | |
|---|---|---|---|
| 2,976,132 | 3/1961 | Dinwiddie et al. | 260—680 |
| 3,064,062 | 11/1962 | Lorz et al. | 260—683.3 |
| 3,168,587 | 2/1965 | Michaels et al. | 260—683.3 |
| 3,243,472 | 3/1966 | Dinwiddie | 260—680 |

DELBERT E. GANTZ, *Primary Examiner.*

G. E. SCHMITKONS, *Assistant Examiner.*